US008046589B2

(12) United States Patent
Akkermans et al.

(10) Patent No.: US 8,046,589 B2
(45) Date of Patent: Oct. 25, 2011

(54) RENEWABLE AND PRIVATE BIOMETRICS (75) Inventors: Antonius Hermanus Maria Akkermans, Eindhoven (NL); Claudine Viegas Conrado, Eindhoven (NL); Theodorus Jacobus Johannes Denteneer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 847 days.

(21) Appl. No.: 11/570,599

(22) PCT Filed: Jun. 22, 2005

(86) PCT No.: PCT/IB2005/052037
§ 371 (c)(1),
(2), (4) Date: Dec. 14, 2006

(87) PCT Pub. No.: WO2006/000989
PCT Pub. Date: Jan. 5, 2006

(65) Prior Publication Data
US 2007/0245154 A1    Oct. 18, 2007

(30) Foreign Application Priority Data
Jun. 25, 2004    (EP) .................................... 04102961

(51) Int. Cl.
*H04L 9/32*    (2006.01)
*H04L 29/06*    (2006.01)

(52) U.S. Cl. ....................................................... 713/186

(58) Field of Classification Search .................... 713/186
See application file for complete search history.

(56) References Cited

U.S. PATENT DOCUMENTS

| 5,790,668 | A | 8/1998 | Tomko |
| 5,991,408 | A | 11/1999 | Pearson et al. |
| 6,035,406 | A | 3/2000 | Moussa et al. |
| 6,038,315 | A * | 3/2000 | Strait et al. .................... 713/183 |
| 6,505,193 | B1 | 1/2003 | Musgrave et al. |
| 2002/0124176 | A1 | 9/2002 | Epstein |

FOREIGN PATENT DOCUMENTS

| WO | 9848538 A | 10/1998 |
| WO | 9926188 A1 | 5/1999 |
| WO | 03100730 A | 12/2003 |
| WO | 2005069534 A | 7/2005 |

* cited by examiner

*Primary Examiner* — Gilberto Barron, Jr.
*Assistant Examiner* — Devin Almeida
(74) *Attorney, Agent, or Firm* — Larry Liberchuk (57) ABSTRACT

The present invention relates to a method of authenticating an individual (321) at an authenticating device (311) and an authenticating system for authenticating an individual. A basic idea of the present invention is to store, at a device or a system with which an individual wishes to authenticate herself, one or more data structures each comprising a value based on an identifier pertaining to the individual and an encrypted copy of the identifier. When the individual wants to authenticate herself, she contacts the authenticating device whereby a request is made to attain the encrypted identifier included in a specific data structure stored at the authenticating device. The individual subsequently provides proof to the authenticating device that she actually knows the identifier.

22 Claims, 4 Drawing Sheets

RENEWABLE AND PRIVATE BIOMETRICS

The present invention relates to a method of authenticating an individual at an authenticating device and an authenticating system for authenticating an individual.

Authentication of physical objects may be used for many applications, such as conditional access to secure buildings or conditional access to digital data (e.g. stored in a computer or removable storage media), or for identification purposes (e.g. used for charging the identified person for a particular activity).

The use of biometrics for identification and/or authentication is to an ever increasing extent considered to be a better alternative to traditional identification means such as passwords and pin-codes. The number of systems that require identification in the form of passwords/pin-codes is steadily increasing and, consequently, so is the number of passwords/pin-codes a user must memorize. As a further consequence, due to the difficulty in memorizing the passwords/pin-codes, the user writes them down, which makes them vulnerable to theft. In the prior art, solutions to this problem have been proposed, which solutions involve the use of tokens. However, tokens can also be lost and/or stolen. A more preferable solution to the problem is the use of biometric identification, wherein features such as fingerprints, irises, faces etc. are used to provide identification of a user. Clearly, a user does not lose or forget his/her biometric features, neither is there any need to write them down or memorize them.

The biometric features are compared to reference data. If a match occurs, the user is identified and can be granted access. The reference data for the user has been obtained earlier and is stored securely, e.g. in a secure database or smart-card. The physical object to be authenticated may also be non-human. For example, the object may be a storage medium like a CD, a DVD or a solid-state memory containing protected digital content. In that case, biometrics is not necessarily used, but in an analog manner, some identifying feature (in the form of e.g. a bit sequence) that should be kept secret is provided and compared to the corresponding reference data.

Whenever a breach of secrecy has occurred in a system, for example when a hacker has obtained knowledge of secrets in a security system, there is a need to replace the (unintentionally) revealed secret. Typically, in conventional cryptography systems, this is done by revoking a revealed secret cryptographic key and distributing a new key to the concerned users. In case a password or a pin-code is revealed, it is replaced by a new one. In biometric systems, the situation is more complicated, as the corresponding body parts obviously cannot be replaced. In this respect, most biometrics are static. Hence, it is important to develop methods to derive secrets from (generally noisy) biometric measurements, with a possibility to renew the derived secret, if necessary. As biometrics provide sensitive information about a human being, there are privacy problems related to the storage, management and usage of biometric data. In order to solve or at least mitigate these problems, biometric data should not be stored in the clear in a database but rather in encrypted, confidential form to provide privacy and to avoid database cross-matching attacks. By solving security-related problems concerning biometrics, the acceptance level for biometric identification will increase.

Typically, the way to solve privacy problems related to biometrics is to encrypt the biometric feature, e.g. a fingerprint, before storing it in a system. To avoid database cross-matching attacks, different keys should be used for encrypting fingerprints comprised in different databases. However, as in conventional cryptography systems, if the cryptographic keys are broken, a hacker can obtain the fingerprint. This is equivalent to actually "stealing" the fingerprint, i.e. the identity of a person. The hacker may thereafter impersonate the person whose identity the hacker stole. To overcome the problems described hereinabove, storing of encrypted biometric features, as well as performing encryption/decryption operations in such a way that a party with a malicious intent may attain the biometric features or security-sensitive cryptographic keys, must be avoided.

U.S. patent application Ser. No. 2002/0124176 discloses a token device for authentication and access control based on biometric information. The token device contains an encryption of a key that is based on an authorized user's biometric information. A security system communicates with the token device to determine whether the current user of the token is the authorized user. The token device requires the presence of the biometric information from the authorized user to operate securely with the security system, using the biometric information to decrypt the aforementioned key for use in the security system. Thus, access will be granted only if the token is presented to the security system while the biometric information is presented to the token. An absence of either the token or the biometric information precludes access. Hence, a copy of the biometric information is useless without the token, and the effects of a breach of security of both the biometric information and token can be minimized by invalidating the breached token.

However, a problem with U.S. 2002/0124176 is that the token that belongs to a user is specific for this particular user. As a consequence, the user must carry the token and bring the token to the application/security system with which the user wants to perform an authentication process.

A first object of the present invention is to solve the above given problem of how to avoid storing of encrypted biometric features, as well as how to avoid performing encryption/decryption operations in such a way that a party with a malicious intent may attain the biometric features or security-sensitive cryptographic keys.

A second object of the present invention is to solve the above given problem of how to provide an authentication system that provides an information enrolment device which is not user specific and which need not be carried around by the user.

These objects are accomplished by a method of authenticating an individual at an authenticating device according to claim 1 and an authentication system for authenticating an individual according to claim 13.

According to a first aspect of the invention, there is provided a method of authenticating an individual at an authenticating device, which method comprises the steps of storing, at the authenticating device, at least one data structure comprising a value based on an identifier pertaining to the individual and an encrypted copy of the identifier, wherein the encryption key is based on a secret of the individual. The method further comprises the steps of receiving, at the authenticating device from the individual, a request to attain the encrypted identifier included in a specific data structure stored at the authenticating device, and sending, from the authenticating device to the individual, the requested encrypted identifier. In the method there is further included the step of receiving, at the authenticating device from the individual, proof that the individual knows the identifier, which identifier has been obtained at the individual by decrypting the encrypted identifier by means of a corresponding secret decryption key.

According to a second aspect of the invention, an authentication system for authenticating an individual is provided, which system comprises an authenticating device arranged with means for storing at least one data structure comprising a value based on an identifier pertaining to the individual and an encrypted copy of the identifier, wherein the encryption key is based on a secret of the individual, and means for receiving a request from the individual to attain the encrypted identifier included in a specific data structure stored at the authenticating device. The system further comprises means for sending the requested encrypted identifier to the individual, wherein the means for receiving are further arranged to receive, from the individual, proof that the individual knows the identifier, which identifier has been obtained at the individual by decrypting the encrypted identifier by means of a corresponding secret decryption key.

A basic idea of the present invention is to store, at a device or a system with which an individual wishes to authenticate herself, one or more data structures each comprising a value based on an identifier pertaining to the individual and an encrypted copy of the identifier. The encrypted key that is employed to encrypt the identifier is based on a secret of the individual. The term "individual" does not necessarily mean an individual person, but may suggest an individual device, such as a mobile phone, a PDA, a laptop, a portable audio player or some other appropriate device having computing and communicating capabilities. The term individual device may also suggest e.g. a smart-card or some other tamper-resistant appliance included in a device such as a mobile phone. When the individual wants to authenticate herself, she contacts the authenticating device whereby a request is made to attain the encrypted identifier included in a specific data structure stored at the authenticating device. At reception of the request, the authenticating device sends the requested encrypted identifier to the individual. The individual decrypts the encrypted identifier with a secret decryption key that corresponds to the encryption key of the individual which was used to encrypt the identifier and provides proof to the authenticating device that she actually knows the identifier.

The present invention is advantageous, since by storing, at the authenticating device, a value based on an identifier pertaining to the individual and an encrypted copy of the identifier, the individual can subsequently prove knowledge of the stored identifier. Due to the fact that the identifier is encrypted with an encryption key of the individual, which encryption key has the property that it is based on a secret of the individual, but which secret cannot be derived by analyzing the encrypted identifier, the individual can prove knowledge of the identifier without revealing her secret. As the decryption key that is used to decrypt the encrypted identifier is known only by the individual, which decryption key corresponds to the encryption key based on the secret of the individual, only the individual can have the identifier in plain text. The proof that the individual knows the identifier may be provided by proving knowledge of the value that is based on the identifier, which value is chosen such that the identifier itself cannot easily be derived from the value. This value is, as described hereinabove, stored at the authenticating device. Hence, the authenticating device is convinced that the individual is the one she claims to be, and thus the individual is authenticated. The secret may be any unique secret of the individual, which the individual does not want to reveal.

According to an embodiment of the invention, the encryption/decryption keys are derived from biometric data of the individual, i.e. the secret of the individual comprises biometric data such as fingerprints, iris or retinal, facial or hand geometry, voice features etc. The physical characteristic, e.g. the fingerprint, is quantized to digital data which is employed to create the cryptographic keys. The creating of keys may be effected in a number of ways. For example, the encryption key may be an exact copy of the quantized biometric data. Another way to create the key is to calculate a hash value for the biometric data, and use the hash value as encryption key. The encryption key and decryption key of the individual may be generated as an asymmetric key pair. As an alternative, the encryption key and the decryption key of the individual may comprise the same secret symmetric key. In any case, the decryption key of the individual (as well as the biometric data itself) must be kept secret.

According to another embodiment of the invention, the biometric data is processed such that it becomes noise invariant and the encryption/decryption keys are derived from the noise invariant biometric data. This embodiment is advantageous, since measured biometric data may contain noise, and the outcome of the quantization of analog biometric data to discrete values may differ from measurement to measurement due to the random nature of the noise. Minor discrepancies in the biometric data, e.g. discrepancies caused by noise-corruption, may be magnified in the quantization process and the actual outcome of the process will bear little or no resemblance with the expected (noise-free) outcome.

Hence, cryptographic keys derived from a set of biometric data are valid for this particular set of biometric data. When an encrypted identifier is stored at the authentication device, the particular encryption key that is used is the result of a first set of biometric data. When this particular encrypted identifier subsequently is received at the individual from the authenticating device, a second set of biometric data, i.e. the current biometric data provided by the individual, is used to derive the corresponding secret decryption key. However, due to the random nature of noise, this decryption key may not resemble the decryption key pertaining to the first set of the biometric data and, as a consequence, the individual cannot prove knowledge of the identifier.

To reduce the risk of producing, in the quantization process, an outcome that does not resemble the expected, noise-free outcome, a robust set of data is created from the measured biometric data. This robust set of data is noise invariant and will be used to create encryption/decryption keys.

According to a further embodiment of the invention, the deriving of the keys from biometric data of the individual is performed in a secure, tamper-resistant environment or module that is trusted by the individual. To obstruct a malicious third party to break cryptographic keys or obtain security-sensitive information, which ultimately could result in the highly undesirable fact that the secret—e.g. the fingerprint—of the individual is revealed, the sensitive information must be handled carefully.

According to yet another embodiment of the invention, the proof that the individual knows the identifier is provided by employing a zero-knowledge protocol between the individual and the authenticating device. This has the advantage that an attacker cannot masquerade as the individual to any third party. This also has the advantage that the biometric data of the individual never is communicated via any link.

According to yet a further embodiment of the invention, each identifier comprises secret random information generated at the individual and the respective value based on an identifier comprises an exponential function, also calculated at the individual, of the corresponding secret random information. This is advantageous, since the secret random information can be chosen from a group of numbers in which computation of square roots is difficult. The value based on an identifier can thus be expressed as the secret random information raised to two, in accordance with the Fiat-Shamir protocol. Alternatively, the value can be expressed as the secret random information raised to some other factor p, in accordance with the Guillou-Quisquater protocol.

According to still another embodiment of the invention, each data structure comprises an index and the request to attain the encrypted identifier of a specific data structure stored at the authenticating device includes the index of said specific data structure. Since the authentication device may have a great number of data structures in storage, there must be a way for the individual to indicate to the authenticating device which specific encrypted identifier the individual requests. This index may be calculated as the encryption of a known value with the hash value of the noise-free biometric data. If the hash value of the noise-free biometric data is used as a key instead of the noise-free biometric data itself, it becomes difficult for an attacker to procure said noise-free biometric data through a known plaintext attack.

Further features of, and advantages with, the present invention will become apparent when studying the appended claims and the following description. Those skilled in the art realize that different features of the present invention can be combined to create embodiments other than those described in the following.

The preferred embodiments of the present invention will be described in detail with reference made to the accompanying drawings, in which.

Figure 1:
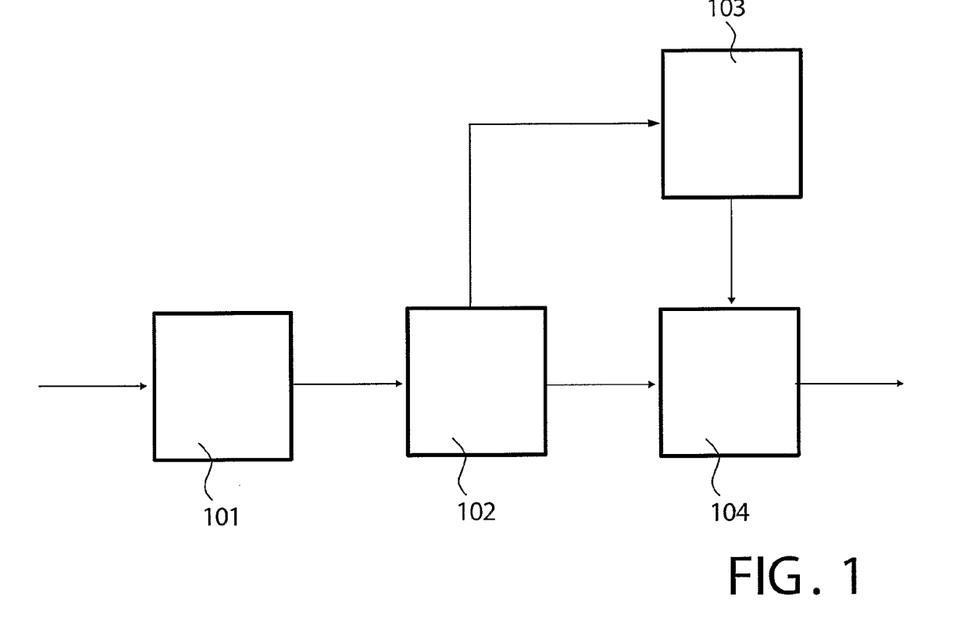
FIG. 1 shows a basic prior art system for identification and authentication of an individual based on biometric data associated with the individual.

FIG. 1 shows a basic prior art system for identification and authentication of an individual based on biometric data associated with the individual. An individual's raw biometric data, e.g. fingerprints, iris or retinal, facial or hand geometry, voice features etc., is acquired at a sensor 101. The acquired data is typically processed at a processing device 102 such as a digital signal processor (DSP). This data is then stored, preferably in encrypted form, in a data base 103 of a service provider. This is an initialization procedure which is performed once for an individual that wishes to access the particular system, in order to register the individual. Encryption is performed to protect the identity, i.e. the biometric data, of the individual. Subsequently, when the individual wishes to access the service, she provides biometric data to the sensor 102. This data is then, after processing, compared to the biometric data of the individual which previously was stored in the data base. If there is a match in the comparison, the individual is given access to the service that is provided.

The biometric data of the individual may be used by a number of different applications and/or service providers, for example banks, department stores, health clubs, libraries etc. This creates a security problem in the system, since attacks may be made to obtain the stored biometric data. Successful attacks may have the effect that a hacker obtains the biometric data from one application and uses this data to impersonate the individual in another application.

Figure 2:
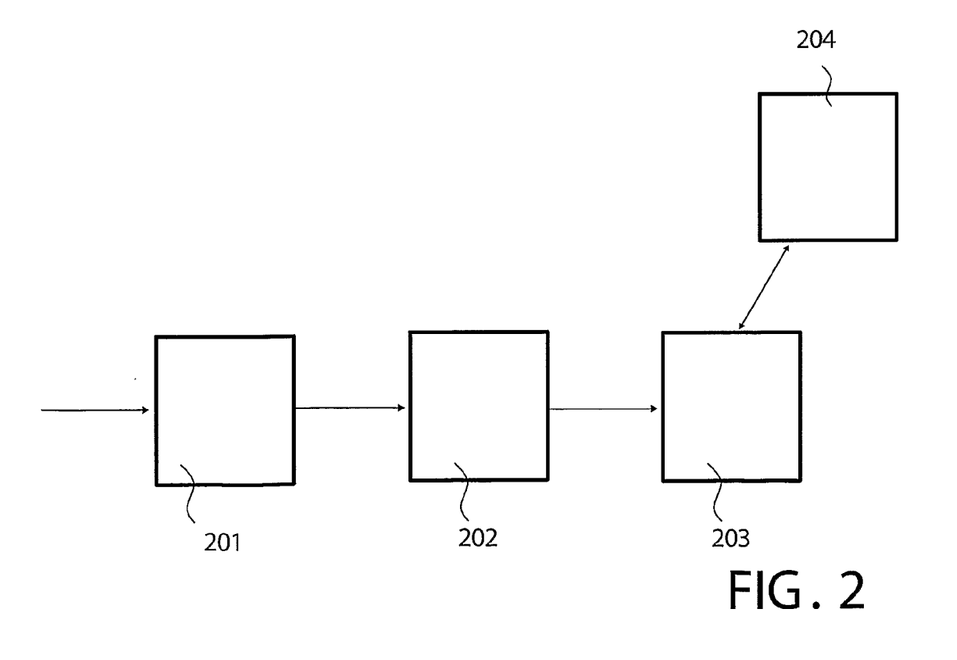
FIG. 2 shows a prior art system in which encryptions of biometric data that is stored in different databases should be performed with different keys.

Therefore, as illustrated in FIG. 2, encryptions of biometric data in databases related to different applications should be performed with different keys. The biometric data of the individual is acquired at the sensor 201 and encrypted at the processing device 202 with a first encryption key before being stored in data base 203. To avoid database cross-matching attacks, different keys should be used for encrypting fingerprints comprised in different databases. Hence, the biometric data stored in data base 204 is encrypted with a second encryption key, which differs from the first key. However, as in conventional cryptography systems, if the cryptographic keys are broken, a hacker can obtain the fingerprint. This is equivalent to actually "stealing" the fingerprint, i.e. the identity of a person. The hacker may thereafter impersonate the person whose identity the hacker stole. Hence, storing of encrypted biometric features, as well as performing encryption/decryption operations in such a way that a party with a malicious intent may attain the biometric features or security-sensitive cryptographic keys, must be avoided.

Another problem is key management, i.e. how and where to store cryptographic keys. Preferably, this must be done in such a way so as to minimize the risk to subject the systems to attacks. It is possible to store the keys in the clear in the data base, where the biometric data also is stored. This straightforward solution is, however, open to attacks. If an attacker can tap the line between the sensor 201 and the processing device 202, to which the encryption key is transferred from the data base 203, the biometric data may be obtained. The cryptographic keys may alternatively be stored on a relatively secure device of the individual, for example a smart card. In this case, every time an individual wants to access the system, she must provide the cryptographic keys to the processing device 202 via her smart card (not shown). However, the problem still remains that a line may be tapped. If an eavesdropper taps the line between the smart card and the processing device 202, to which the encryption key is transferred from the smart card, the biometric data may be obtained.

Figure 3:
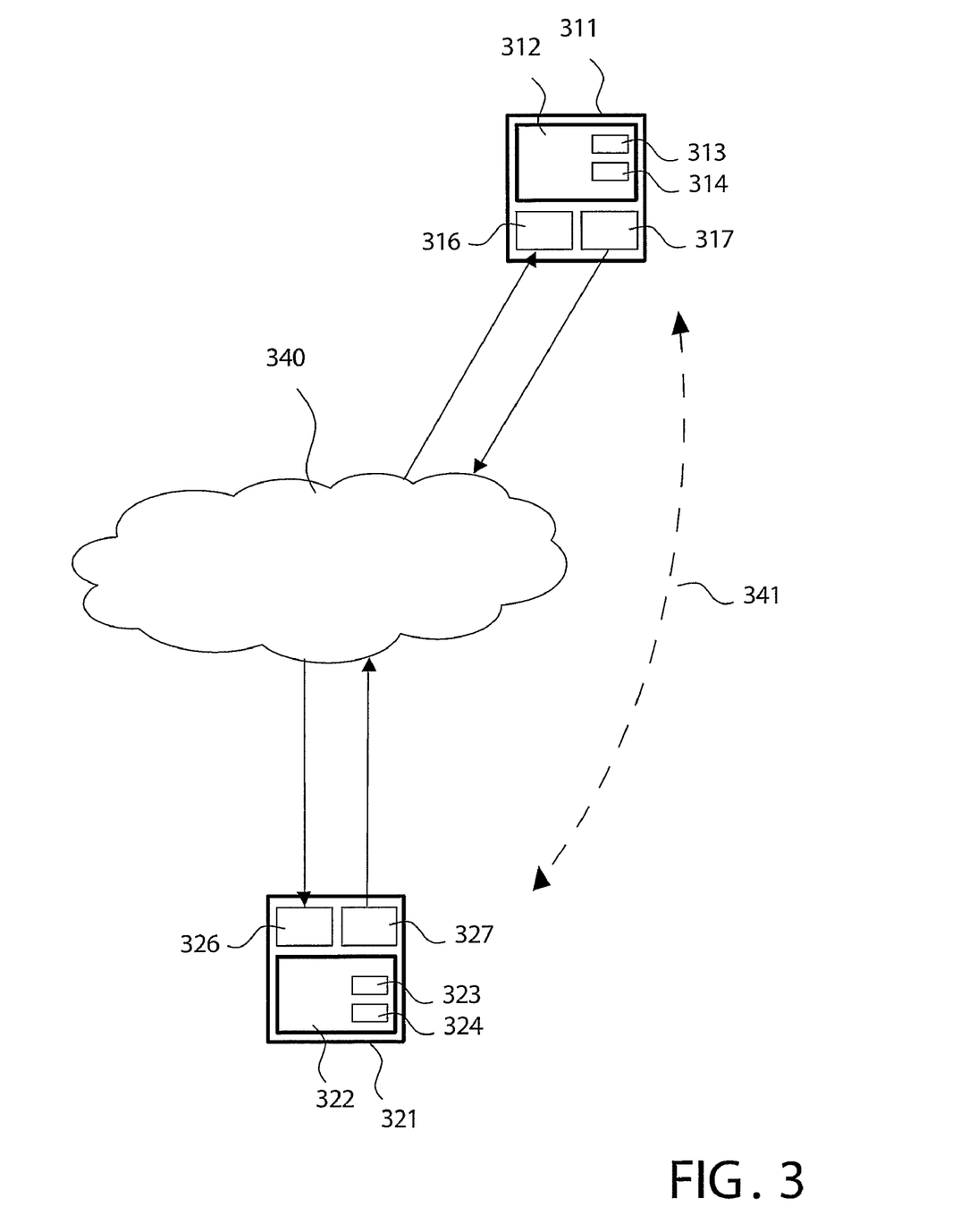
FIG. 3 shows an authorization system according to an embodiment of the present invention.

FIG. 3 shows an authorization system according to an embodiment of the present invention. An "individual" is shown in the form of a user device 321, which can for example be a smart card or a USB dongle arranged in a device such as a mobile phone, a PDA, a laptop, a portable audio player or some other appropriate device having computing and communicating capabilities. Further shown is an authenticating device 311 at which the user device wishes to authenticate itself. Typically, a system as shown in FIG. 3 comprises a plurality of user devices and may also comprise a number of authenticating devices, which typically are managed by different service providers.

The devices, i.e. the user device(s)-authenticating device (s), may be interconnected via a network 340, for example the Internet, but can also be interconnected directly as illustrated via communication channel 341. Hence, the devices may be physically far removed, but they may also be located adjacent to each other, or even located in the same physical device. Computing capabilities are typically embodied by a processing unit 312, 322 in each device. The processing units comprise a processor 313, 323, a memory 314, 324 and possibly other necessary standard electronic equipment. The processing units handle e.g. encryption/decryption functionality. Each of the devices 311, 321 are arranged with receiving means 316, 326 for receiving information from the network or from other devices and transmitting means 317, 327 for transmitting information.

The devices comprised in the system are assumed to be compliant. This means that the devices comply with a given standard and adhere to certain operation rules. It also means that the devices communicates by means of a certain protocol such that they answer questions and requests, which are posed to them, in an expected way. Note that the skilled man realizes that the processing units 312, 322 in the devices 311, 321 typically executes appropriate software to perform the steps as described in connection to FIG. 4-5.

For authentication to be possible, the user device 321 must register at the authenticating device 311. The individual generates one or more secret random numbers RAN ($RAN_m$, where m=1, 2, ..., M). RAN is referred to as the identifier of the user device. A property of secret random number RAN $\in Z_n^*$, is that computing square roots in the multiplicative group $Z_n^*$ is a hard problem.

Next, the user device encrypts the secret numbers with an encryption key. The encryption key is based on a secret of the individual, for example a code only known by the individual, so only the individual can transform the encrypted identifier into plain text. The individual supplies the secret value to the user device, which performs the cryptographic operations. The user device then discards the secret. The decryption key that corresponds to this encryption key is secret, and is only known by the user device. The encryption key/decryption key may form a symmetric key pair in which case the keys are identical and secret. Alternatively, encryption key/decryption key form an asymmetric key pair in which case at least the decryption key (i.e. the private key in the pair) is secret. In the following description of this embodiment, it is assumed that an asymmetric key pair is used. The user device then calculates PK[$RAN_m$] for all M (i.e. m=1, 2, ..., M) values of RAN, where PK[RAN] is the encryption of RAN with PK, and PK is the public key of the user device, which key hence is based on a secret of the individual. The user device also calculates $RAN_m^2$, which is to be included in data structures to be sent to the authenticating device 311.

Figure 4:
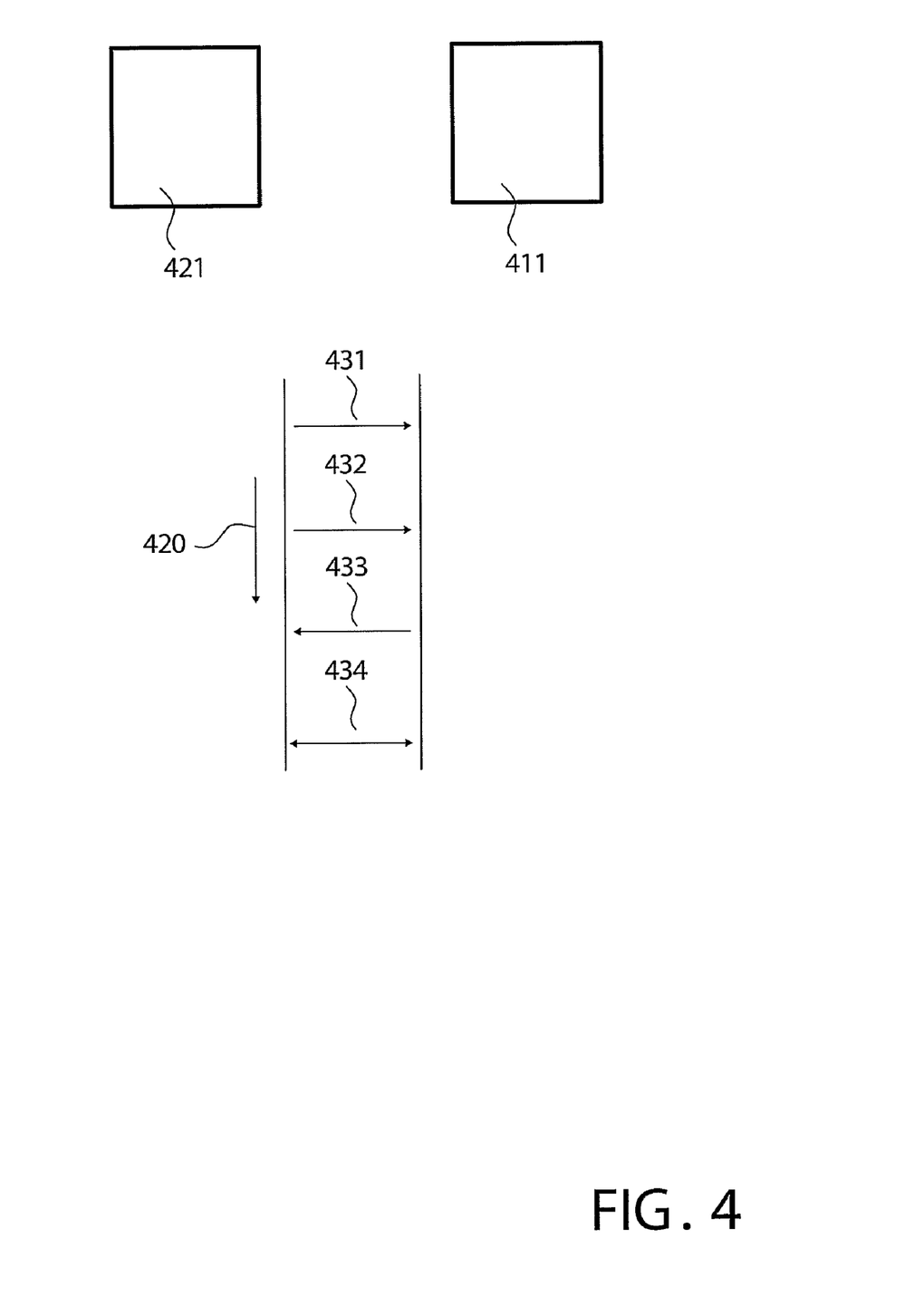
FIG. 4 illustrates an authentication procedure of a user device at an authenticating device.

With reference made to FIG. 4, which illustrates an authentication procedure of a user device 421 at an authenticating device 411 along a timeline 420. The user device sends to the authenticating device a number M of data structures of the form:

[$RAN^2$, PK[RAN]];

that is, the authenticating device stores, at step 431, the plurality M of data structures that each comprises a value $RAN_m^2$ based on an identifier $RAN_m$ pertaining to the user device, and at least one encrypted copy PK[$RAN_m$] of the identifier. The procedure hitherto described is the registration procedure and may, ideally, only be performed once. That is, the data structure stored at the authenticating device 421 may be used again and again each time the user device 411 wishes to authenticate itself. If a higher level of security is required in the system, it may be necessary to occasionally renew the data structure(s) stored at the authenticating device.

When registration of the user device has taken place, the authenticating device may, at step 432, receive a request from the user device to attain a specific encrypted identifier PK[$RAN_m$] pertaining to this user device, which encrypted identifier previously was included in a data structure stored at the authenticating device. When receiving the request, the authenticating device sends, at step 433, the specific encrypted identifier back to the user device. The identifier is, by means of decrypting the encrypted identifier with a private key SK that corresponds to the public key PK, obtained in plain text at the user device. This can only be done if the secret of the individual is provided to the user device.

Finally, at step 434, the authenticating device receives proof that the user device knows the identifier RAN that was comprised in the data structure that previously was sent to the authenticating device.

The proof may be provided by means of a zero-knowledge protocol between the user device 421 and the authenticating device 411. The well-known Fiat-Shamir identification protocol can be used to prove to the authenticating device the knowledge of the secret random number RAN $\in Z_n^*$, whose square value $RAN^2$ is available to the authenticating device from the data structures. This protocol is based on the fact that computing square roots in the multiplicative group $Z_n^*$ is a hard problem. In applications were communication cost is an issue, for example if the user device is implemented using a smart card, the Guillou-Quisquater identification protocol is more suited, with higher powers of RAN ($RAN^p$, where p is a prime), since exchanges between the user device and the authenticating device can be kept to a minimum. The value RAN is a different randomly chosen value in $Z_n^*$ for each data structure stored at the authenticating device, so the value $RAN^2$ is also unique per data structure. Note that it is not necessary to keep the RAN values in storage in the user device.

The user device decryption key SK, which either is the same for all data structures of a given user device, or different for different structures but at least derived from common key generation data, is not in the clear. Because only the user device has access to the private key SK corresponding to the public key PK, only the user can retrieve RAN from the data structure. The step of user authentication happens implicitly when the user device retrieves the value RAN, for only a user who knows the private key SK, corresponding to the user public key PK, is able to decrypt PK[RAN] to obtain the value RAN.

The communication protocol used in the present invention to authorize the user device at the authenticating device is typically of the cut and choose type. That is, the user device generates a number of secret values which are calculated according to a specific procedure. A secret that is calculated according to this given procedure can only be verified if the secret is revealed. Therefore, the authenticating device chooses, at random, a number of these secret values, which values the user device reveals to the authenticating device. If at least one of these values has not been calculated according to the given procedure, the authenticating device refuses all other values and the protocol finishes. If, on the other hand, all of these values have been calculated according to the given procedure, the authenticating device can be confident that the unrevealed secret values also have been calculated in accordance with the given procedure.

Hence, after having engaged in the zero-knowledge protocol, the authenticating device 411 is convinced that the user device 421 knows the identifier RAN (that only that user device could know), but nothing is revealed to the authenticating device about that identifier. During the zero-knowledge protocol, there are a number of rounds of information exchange between the user device and the authenticating device, and in each round, the confidence of the authenticating device increases given the fact that the user device actually knows the identifier RAN. If the authenticating device is sufficiently convinced that the user device knows the identifier RAN, it acts accordingly. If the authenticating device acts as content device, it can give the user access to digital content in the form of, for example, MPEG or MP3 files or other audio and/or video content. In another embodiment, the authenticating device can communicate the results to a different device operating as content device. With the procedure described in connection to FIG. 4, the authenticating device 411 can be confident that the user device 421 knows the private (secret) key SK that corresponds to the public key PK used to encrypt the identifier RAN, which encrypted identifier is contained in the stored data structure. However, the authenticating device does not learn anything about that public key.

In another embodiment of the present invention, an authentication system is provided in which biometric data is used to identify an individual. For an illustration of the system according to this particular embodiment, reference is made again to FIG. 3. In the following description of this embodiment, the device denoted by 321, which hitherto has been referred to as a user device, is referred to as a sensor device. For authentication to be possible, the individual must, by means of the sensor device 321, register at the authenticating device 311.

First, the sensor device generates one or more secret random numbers RAN ($RAN_m$, where m=1, 2, ..., M). Next, the sensor device encrypts the secret numbers with an encryption key. In this embodiment, the individual physically approaches the system at the sensor device 321 which acquires biometric data of the individual. A physical characteristic, e.g. the fingerprint of the individual, is quantized by the sensor into digital biometric data B which is employed to create cryptographic keys. The creating of keys may be effected in a number of ways. For example, the encryption key may be an exact copy of the quantized biometric data B. Another way to create the key is to calculate a hash value for the biometric data, and use the hash value H(B) as encryption key. The encryption key and decryption key of the individual may be generated as an asymmetric key pair. As an alternative, the encryption key and the decryption key of the individual may comprise the same secret symmetric key, in which case both keys in the pair must be kept secret. Many different ways to perform cryptographic operations is realized by a skilled person. In any case, the decryption key of the individual (as well as the biometric data itself must be kept secret. In the following description of this embodiment, it is assumed that a symmetric key pair is used.

The sensor device 321 then calculates $B[RAN_m]$ for all M (i.e. m=1, 2, ..., M) values of RAN, where $B[RAN_m]$ is the encryption of RAN with B, and B is the digital biometric data of the individual. The sensor device also calculates $RAN_m^2$, which is to be included in data structures to be sent to the authenticating device 311. The sensor device is trusted in that it neither discloses or stores the biometric data B nor the secret random number RAN. The sensor device should also be enclosed in a tamper-resistant appliance such that attacks on the sensor device is hampered.

Figure 5:
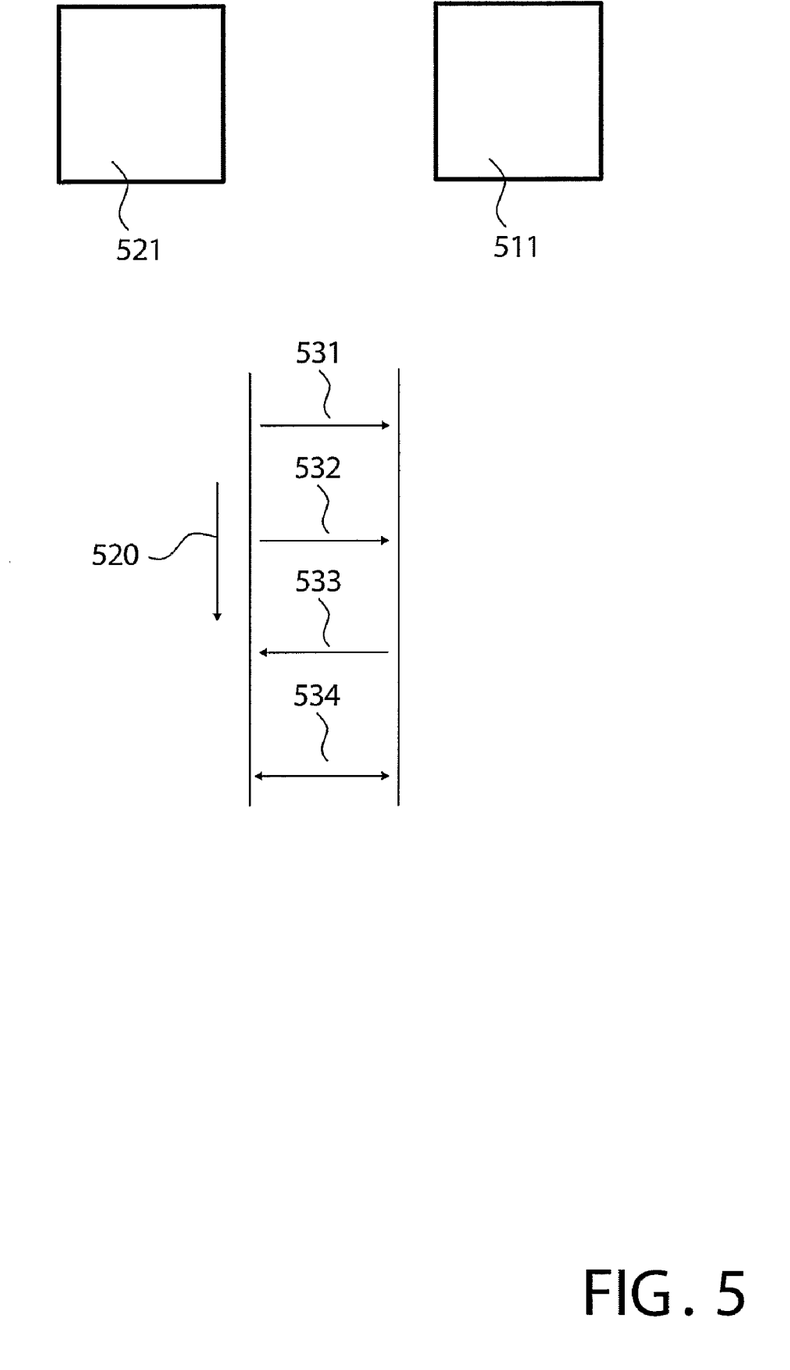
FIG. 5 illustrates an authentication procedure of an individual at an authenticating device.

Reference is made to FIG. 5, which illustrates an authentication procedure of an individual by means of a sensor device 521 at an authenticating device 511 along a timeline 520. The sensor device 521 sends to the authenticating device a number M of data structures of the form:

$[RAN^2, B[RAN]]$;

that is, the authenticating device stores, at step 531, the plurality M of data structures that each comprises a value $RAN_m^2$ based on an identifier $RAN_m$ and at least one encrypted copy $B[RAN_m]$ of the identifier. After registration of the individual, the authenticating device may, at step 532, receive a request from the sensor device to attain a specific encrypted identifier $B[RAN_m]$, which encrypted identifier previously was included in a data structure stored at the authenticating device. When receiving the request, the authenticating device returns, at step 533, the specific encrypted identifier. The identifier is, by means of decrypting the encrypted identifier with a symmetric decryption key B that corresponds to the encryption key B, obtained in plain text at the user device. The identifier can only be obtained if the individual provides the sensor device with the correct biometric data, i.e. by supplying the sensor device with the fingerprint.

Finally, at step 534, the authenticating device receives proof that the user device knows the identifier RAN that was comprised in the data structure that previously was sent to the authenticating device by means of a zero-knowledge protocol. Again, since only the individual has access to the decryption key B, only the user can retrieve RAN from the data structure. The step of individual authentication happens implicitly when the user device retrieves the value RAN, for only an individual who knows the key B is able to decrypt B[RAN] to obtain the value RAN.

When a device/individual makes a request to attain a specific encrypted identifier stored at the authenticating device, as described hereinabove, there must be a way for the individual to indicate to the authenticating device which specific encrypted identifier the individual requests. Hence, an index Ind may be included in each data structure:

$[RAN^2, B[RAN], Ind]$

Ind may be calculated as Ind=H(B)[N], where N is a standard value that is encrypted with a hash value H(B) of the biometric data. By using a hash value instead of the biometric data itself, known plaintext attacks (due to the fact that N is not secret) can be hampered. Since the authentication device may have a great number of data structures in storage, the index enables the individual to indicate to the authenticating device which specific encrypted identifier she requests.

According to another embodiment of the invention, since measured biometric data may contain noise, and the outcome of the quantization of analog biometric data to discrete values may differ from measurement to measurement due to the random nature of the noise, the biometric data is processed such that it becomes noise invariant and the encryption/decryption keys are derived from the noise invariant biometric data. Relatively noise-free biometric data may be obtained by performing a number of measurements of the physical characteristic, e.g. the fingerprint, which is quantized to digital biometric data employed to create the cryptographic keys. If the signal to noise ratio of a measurement exceeds a desired threshold value, the measurement is considered to be noise-invariant, and may thus be used to create cryptographic keys.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of authenticating an individual at an authenticating device, comprising:
    storing, at the authenticating device, at least one data structure comprising a value based on an identifier (RAN) pertaining to the individual and an encrypted identifier (PK[RAN]), wherein an encryption key (PK) is based on a secret of the individual;
    receiving, at the authenticating device, a request from the individual to attain the encrypted identifier;
    sending, from the authenticating device to the individual, the requested encrypted identifier;
    receiving, at the authenticating device from the individual proof that the individual knows the identifier, which has been obtained at the individual by decrypting the encrypted identifier using a corresponding secret decryption key (SK); and
    verifying the proof, wherein the proof is verified by employing a zero-knowledge protocol between the individual and the authentication device.

2. The method according to claim 1 wherein said keys are derived from biometric data (B) of the individual.

3. The method according to claim 2, wherein said biometric data (B) is processed such that it is noise invariant and said keys are derived from the noise invariant biometric data.

4. The method according to claim 2, wherein acquisition of said biometric data (B) of the individual and the deriving of the keys from said biometric data of the individual is performed in a secure environment.

5. The method according to claim 1, wherein each identifier comprises secret random information (RAN) generated at the individual.

6. The method according to claim 5, wherein the respective value based on an identifier comprises an exponential function of the corresponding secret random information (RAN).

7. The method according to claim 1, wherein the authenticating device stores a plurality of different data structures pertaining to the individual.

8. The method according to claim 1, wherein each data structure comprises an index (Ind) and the request to attain the encrypted identifier (PK[RAN]) of a specific data structure stored at the authenticating device includes the index of the data structure.

9. The method according to claim 8, wherein the index (Ind) comprises a number (N) encrypted with the hash value (H(B)) of the noise invariant biometric data.

10. The method according to claim 1, wherein said encryption key (PK) and said decryption key (SK) of the individual comprises an asymmetric key pair.

11. The method according to claim 1, wherein said encryption key (B) and said decryption key (B) of the individual comprises the same secret symmetric key.

12. An authentication system for authenticating an individual, comprising:
an authenticating device arranged with a memory for storing at least one data structure comprising a value based on an identifier (RAN) pertaining to the individual and an encrypted identifier (PK[RAN]), wherein an encryption key (PK) is based on a secret of the individual;
a receiver for receiving a request from the individual to attain the encrypted identifier;
a transmitter for sending the requested encrypted identifier to the individual;
wherein the receiver receives, from the individual, proof that the individual knows the identifier, which has been obtained at the individual by decrypting the encrypted identifier using a corresponding secret decryption key (SK); and
a processor for verifying the proof, wherein the proof is verified by employing a zero-knowledge protocol between the individual and the authentication device.

13. The authentication system according to claim 12, further comprising a sensor device arranged with a processor to derive said keys from biometric data (B) of the individual.

14. The authentication system according to claim 13, wherein the sensor device further comprises the processor for processing said biometric data (B) to be noise invariant and the keys are derived from the noise invariant biometric data.

15. The authentication system according to claim 13, wherein the processor for acquiring said biometric data (B) of the individual and for deriving the keys from said biometric data of the individual is in a secure environment.

16. The authentication system according to claim 12, wherein each identifier comprises secret random information (RAN) generated at the individual.

17. The authentication system according to claim 16, wherein the respective value based on an identifier comprises an exponential function of the corresponding secret random information (RAN).

18. The authentication system according to claim 12, wherein the memory of the authenticating device is arranged to store a plurality (M) of different data structures pertaining to the individual.

19. The authentication system according to claim 12, wherein each data structure comprises an index (Ind) and the request to attain the encrypted identifier (PK[RAN]) of a specific data structure stored at the authenticating device includes the index of said specific data structure.

20. The authentication system according to claim 19, wherein the index (Ind) comprises a number (N) encrypted with the hash value (H(B)) of the noise invariant biometric data.

21. The authentication system according to claim 12, wherein said encryption key (PK) and said decryption key (SK) of the individual comprises an asymmetric key pair.

22. The authentication system according to claim 12, wherein said encryption key (B) and said decryption key (B) of the individual comprises the same secret symmetric key.

* * * * *